United States Patent [19]
Bullinger et al.

[11] Patent Number: 6,162,271
[45] Date of Patent: Dec. 19, 2000

[54] FILTER WITH HOUSING

[75] Inventors: Alfred Bullinger, Korntal; Michael Leonhardt, Benningen; Hans-Peter Scholl, Mundelsheim, all of Germany

[73] Assignee: Filterwerk Mann & Hummel GmbH, Ludwigsburg, Germany

[21] Appl. No.: 09/242,728

[22] PCT Filed: Jul. 11, 1997

[86] PCT No.: PCT/EP97/03678

§ 371 Date: Sep. 23, 1999

§ 102(e) Date: Sep. 23, 1999

[87] PCT Pub. No.: WO98/07978

PCT Pub. Date: Feb. 26, 1998

[30] Foreign Application Priority Data

Aug. 22, 1996 [DE] Germany .................... 196 33 896

[51] Int. Cl.[7] .................................................. B01D 46/00
[52] U.S. Cl. ........................... 55/385.3; 55/493; 55/502; 55/506
[58] Field of Search .............................. 55/493, 502, 504, 55/505, 506, 385.3, 497, 499

[56] References Cited

U.S. PATENT DOCUMENTS

| | | | |
|---|---|---|---|
| 2,962,121 | 11/1960 | Wilber | 55/493 |
| 4,632,681 | 12/1986 | Brunner | 55/493 |
| 4,925,469 | 5/1990 | Clement et al. | 55/493 |
| 5,062,875 | 11/1991 | Nagashima | 55/493 |
| 5,213,596 | 5/1993 | Kume et al. | 55/493 |
| 5,304,300 | 4/1994 | Parsons | 55/493 |
| 5,746,796 | 5/1998 | Ambs et al. | 55/493 |
| 6,001,145 | 12/1999 | Hammes et al. | 55/493 |

*Primary Examiner*—David A. Simmons
*Assistant Examiner*—Minh-Chan T. Pham
*Attorney, Agent, or Firm*—Evenson, McKeown, Edwards & Lenahan, P.L.L.C.

[57] ABSTRACT

A filter with housing including a filter element (12) shaped as a round cartridge, a housing (10) and a housing lid (11). The housing has a raw air inlet (19) and a clean air outlet (20). The clean air outlet is provided with a connecting support (16) on which the filter element (12) is arranged. The filter element has a radial gasket on its side that faces the connecting support and is guided by the housing at its side opposite from the connecting support.

8 Claims, 4 Drawing Sheets

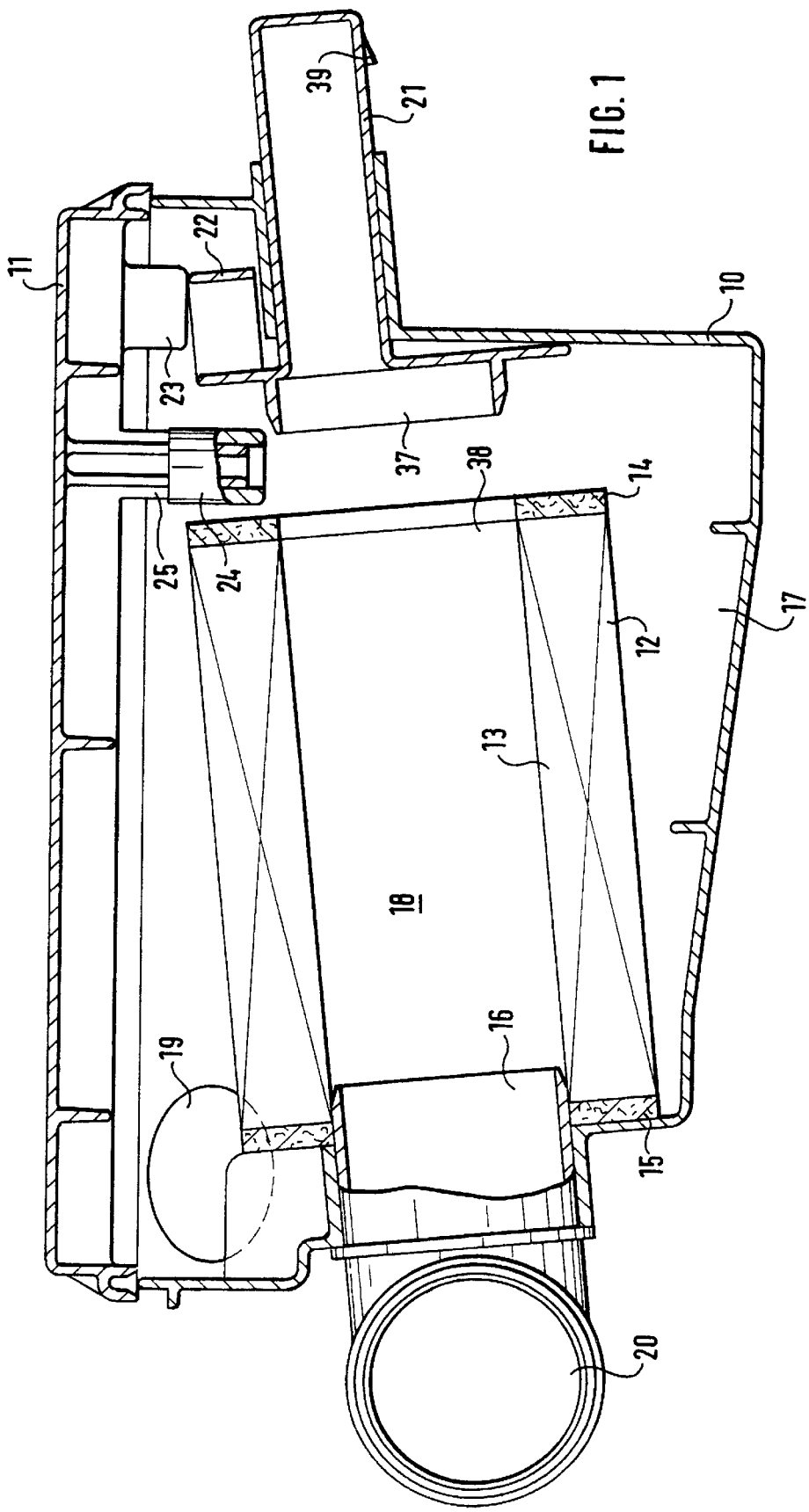

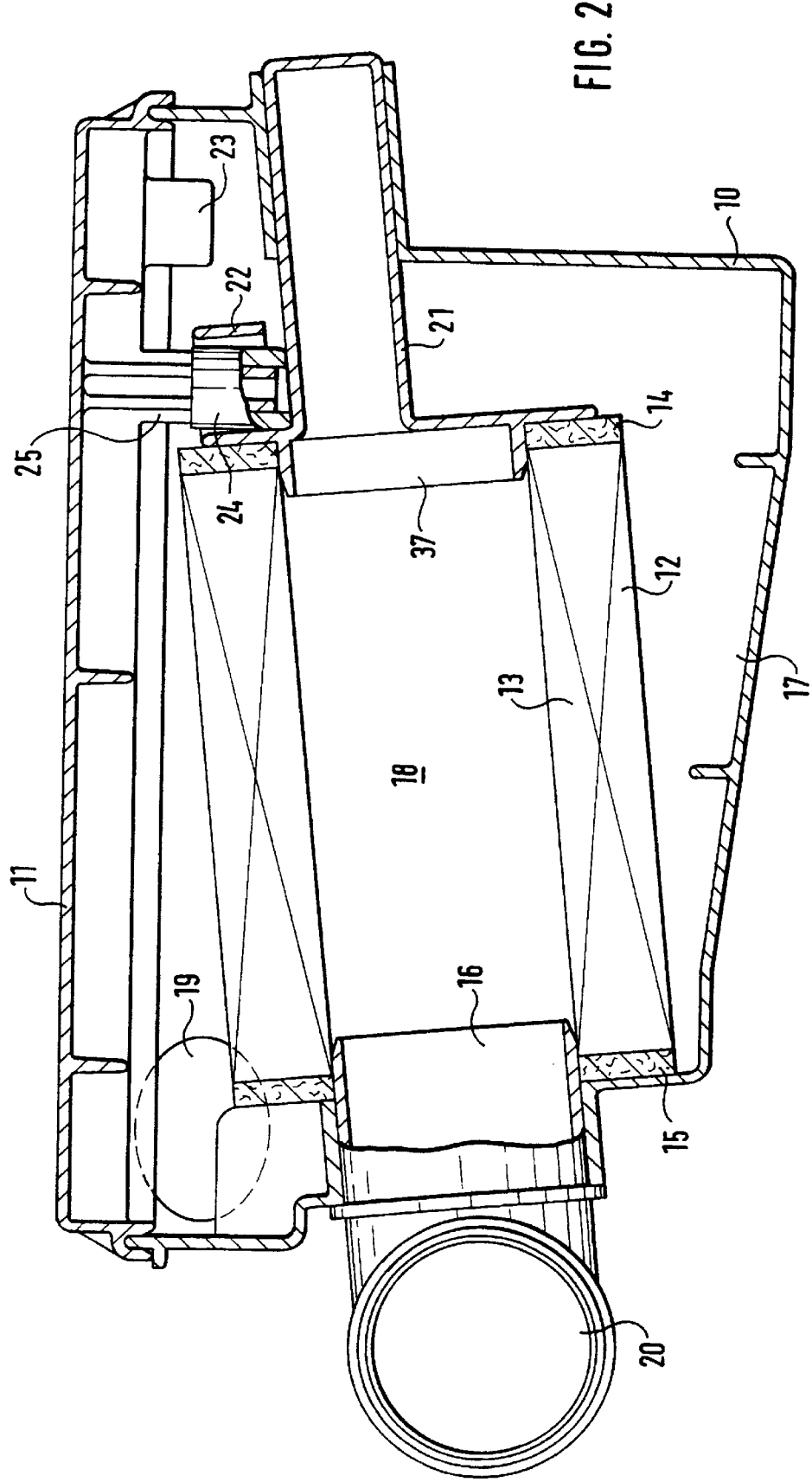

FILTER WITH HOUSING

BACKGROUND OF THE INVENTION

The invention relates to a filter with housing comprising a filter element in the form of a round cartridge, a housing with a raw air inlet and a clean air outlet, and a housing lid, in which the clean air outlet is provided with a connecting piece on which the filter element is arranged.

EP 317 417 A2 discloses a filter with housing in which a filter cartridge is clamped in a housing and can be fixed by means of a cam and a spring element. In order to fix the filter cartridge reliably in the housing, high restraining forces are necessary. These are produced by means of appropriate mounting elements.

The filter cartridge is sealed off axially. This means that a certain compensation for tolerance is necessary since a filter cartridge exhibits particular length tolerances. Likewise, additional mechanical elements are necessary for this tolerance compensation.

SUMMARY OF THE INVENTION

The object of the invention is to provide a filter with housing which can be manufactured with a low expenditure in construction components; which does not require any elements compensating for tolerance, and which avoids the disadvantages noted above.

This object is achieved by the invention as described hereinafter.

The significant advantage of the invention lies in that the construction in accordance with the invention leads to reliable support of the filter element, both in the area of the connecting piece as well as on the opposite side. Several possibilities exist for fastening the filter element on the opposite side. For one, it is possible to support the filter in the peripheral area at the housing wall. Another possibility, as described in another embodiment of the invention, is to provide an axial stop for the filter element, which directly or indirectly fixes the axial position of the filter element. This axial stop can be constructed as a manually actuatable sliding element, or a hinge or a flap, by means of which the support on the housing ensues. In a sliding element, the guidance of the filter element occurs by means of appropriate guiding surfaces or, in accordance with further development, through an axial opening of the filter element into which a guiding support of the sliding element engages. So that the position of the sliding element is defined within a certain area, the sliding element can be fitted with a detent projection which forms a stop on the housing in accordance with another embodiment of the invention.

It is necessary to assure that operation of the internal combustion engine without the filter is prevented, especially when the filter is used for the intake air of an internal combustion engine. This can be achieved in accordance with one embodiment of the invention, in that a blocking element is provided on the sliding element which prevents closure of the housing lid if no filter element or an improperly installed filter element is present. Only when the filter element is properly installed, can the lid be closed correctly, such that with a closed lid it is assured that a filter element is installed properly and thus the intake air will be guided through the filter element.

In accordance with further embodiment, it is proposed to provide the filter element with a support body and to effect the seal on the clean air side by means of the support body. The support body has the advantage that especially high differential pressures can be absorbed effectively. This support body can, for example, have a gasket in the form of an O-ring gasket, which effects the sealing between the raw air chamber and the clean air chamber.

These and further characteristics of preferred embodiments of the invention are found not only in the claims, but also appear from the specification and the drawings, whereby the individual features can each be realized individually or together in various subcombinations in embodiments of the invention and in other fields, and may represent advantageous embodiments which are themselves worthy of protection and for which protection is claimed here:

BRIEF DESCRIPTION OF THE DRAWINGS

The invention is explained below in further detail with reference to illustrative embodiments.

FIG. 1 shows a sectional view of a filter with housing with an opened lid,

FIG. 2 shows the filter with housing shown in FIG. 1 with a closed lid,

DESCRIPTION OF PREFERRED EMBODIMENTS

Figure 3A:
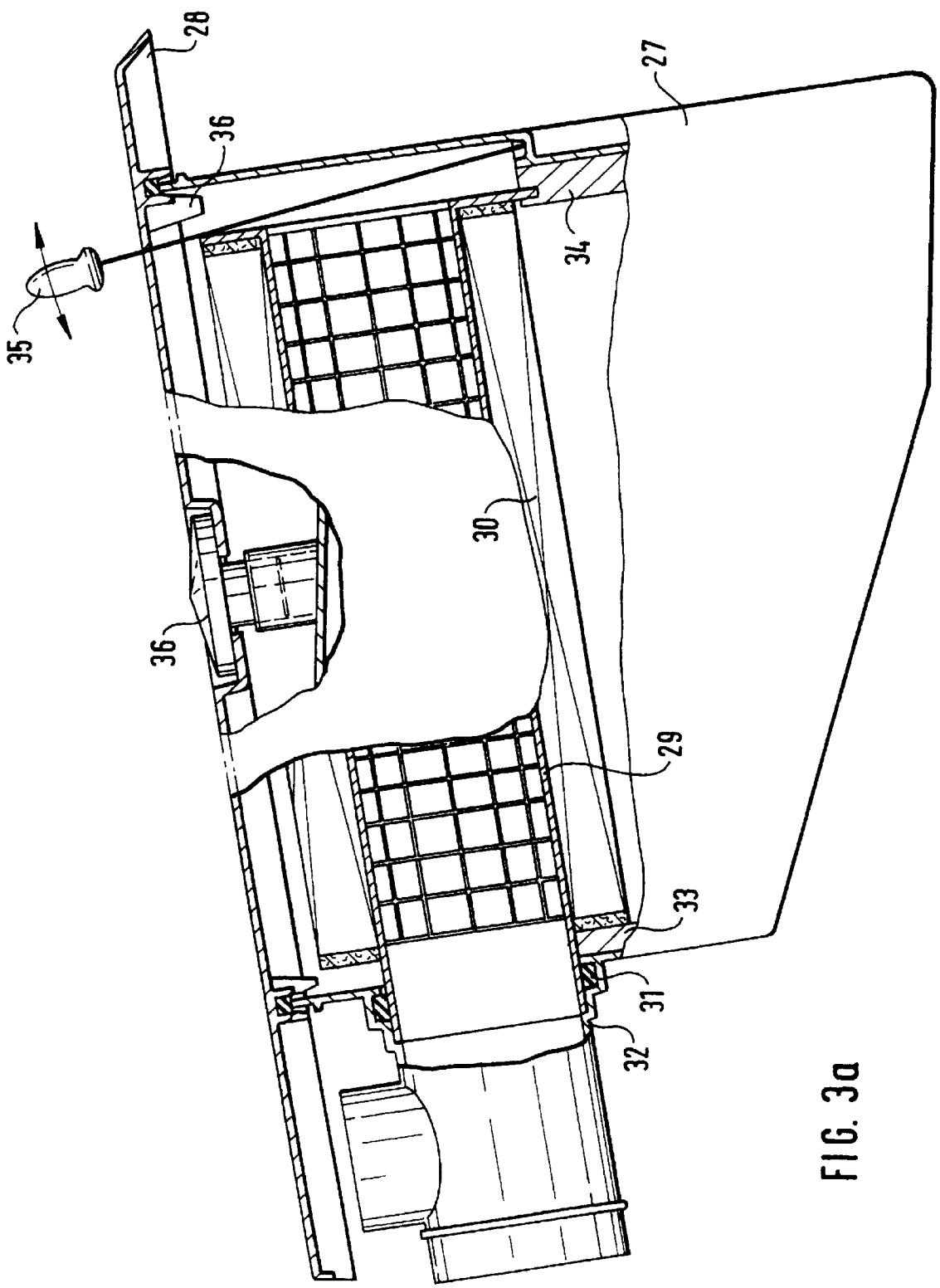
FIGS. 3a through c show various views of a filter system with a support tube.

The filter shown in FIG. 1 comprises a housing 10, a housing lid 11, and a filter element 12 which is arranged in the housing. The filter element 12 is a paper filter 13 with zig-zag-shaped folds in a star configuration. The paper filter 13 has end discs 14, 15 on its end faces. The end disc 15 is slid over a connecting piece 16 of the housing 10 and produces a radial sealing between the raw air chamber 17 and the clean air chamber 18. The raw air flows into the raw air chamber 18 through the raw air inlet 19. While the entrained particles are filtered out by the filter element 12, the filtered air leaves the filter system through the clean air chamber 18 and the connecting piece 16, as well as the clean air tube 20. The housing is equipped with a sliding element 21 for stabilizing the filter element 12. The sliding element 21 is located in the position shown here to install or remove the filter element 12. The sliding element has a blocking element 22 which in the position shown prevents closure of the lid 11 which is provided with a projection 23. This means that with an opened sliding element 21, it is not possible to use the housing filter. Instead, this position is only suitable for exchanging the filter element 12. The sliding element 11 also includes a stop projection 39 for defining a range of displacement of the sliding element 21 relative to the housing. The housing lid 11 also has a securing element 24. This consists of a rod 25 and an elastomer cap 26 fastened thereon.

The manner of operation of the securing element 24 is explained in more detail with reference to FIG. 2. Corresponding parts are identified by the same reference numbers.

The operational position is attained as soon as the sliding element 21 is moved to the filter element 12. This operational position can be seen in FIG. 2. The right side sealing of the filter element between the raw air chamber and the clean air chamber also ensues here by means of a support guide 37 which produces a radial seal in conjunction with the end disc 14. In the position of the sliding element 21 shown here, the securing element 24 can engage inside the blocking element 22 and prevents opening of the sliding element 21. At the same time, an orderly closing of the housing lid 11 is now possible. The housing lid 11 is secured to the housing with tensioning clamps or snap closures.

The elastomer cap 26 on the rod 25 creates a weak connection between the lid and the sliding element 21 and prevents a transfer of vibrations or shaking. In addition, the weak connection has a tolerance-compensating effect.

The different views a–c of FIG. 3 show a filter system with a support tube. A filter housing 27 is provided with a housing lid 28. The filter element 30 is located on a support tube 29 in the filter housing. The support tube is connected to the clean air connecting piece 32 via a sealing element 31. The filter element can be centered or prepositioned adjacent the ribs 33, 34 of the filter housing. To install the filter element 30, this can be moved by means of a suitable medium, for example with a lever 35, into the axial target position shown here. For disassembly, the filter element is pulled from this target position and removed in an upward direction.

The housing lid is fitted with a safety device 36. This safety device comprises a projection extending into the interior of the housing. To the extent that the filter element 30 is not in the target position, this projection prevents the closing of the housing lid.

Figure 3B:
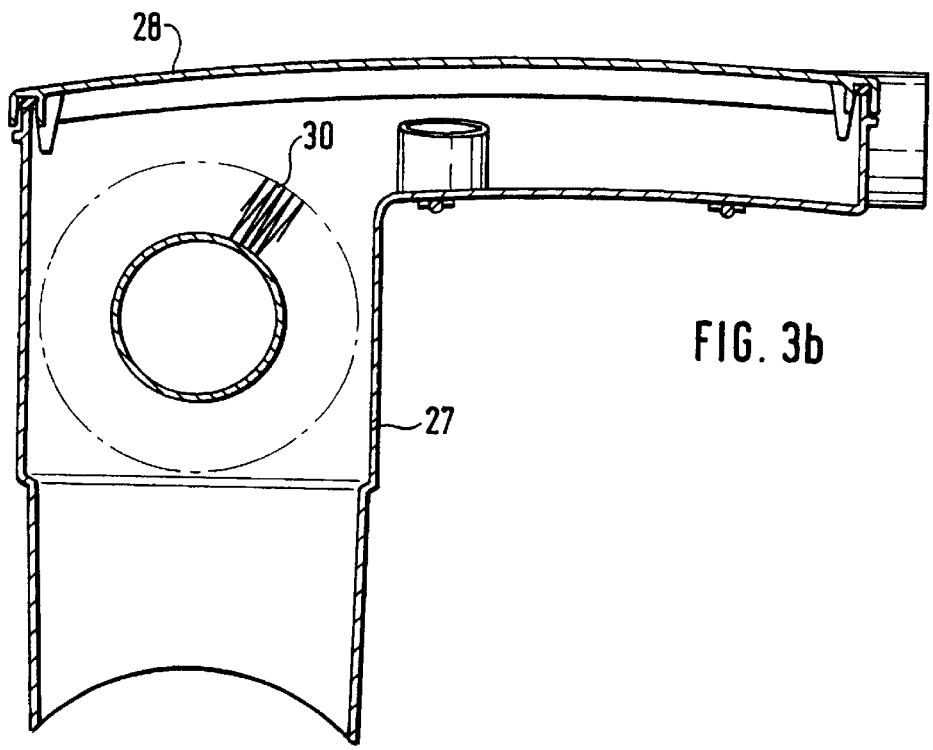
Figure 3C:
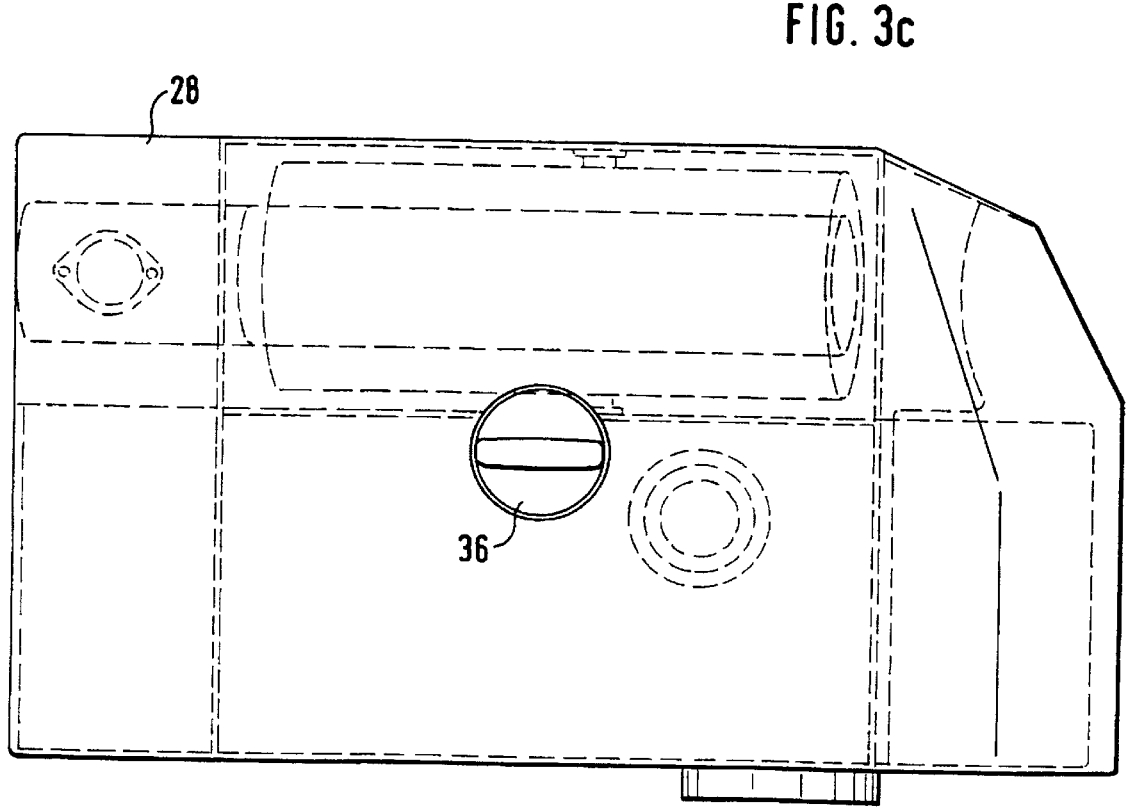

As shown in FIG. 3b, the filter element is arranged asymmetrically in the housing. The lid 28 is provided with a central closure 36 according to FIG. 3c. This central closure is for example a bayonet plug and enables a particularly rapid and trouble-free opening and closing of the housing lid 28.

What is claimed is:

1. A filter with housing, comprising a filter element in the form of a cylindrical cartridge, a housing and a housing lid, wherein the housing has a raw air inlet and a clean air outlet, and the clean air outlet is provided with a connecting support on which the filter element is arranged, the filter element has a radial gasket on the side facing the connecting support, and the filter element on the side opposite from the connecting support is guided by a sliding element provided on the housing, said housing lid including a securing element and said sliding element including a locking element, wherein the securing element engages the locking element when the housing lid is closed thereby preventing movement of the slide element.

2. A filter with housing according to claim 1, wherein said securing element fixes the axial position of the filter element.

3. A filter with housing according to claim 1, wherein the sliding element carries a support guide which engages in an axial opening of the filter element.

4. A filter with housing, comprising a filter element in the form of a cylindrical cartridge, a housing and a housing lid, wherein the housing has a raw air inlet and a clean air outlet, and the clean air outlet is provided with a connecting support on which the filter element is arranged, the filter element has a radial casket on the side facing the connecting support, and the filter element on the side opposite from the connecting support is guided by a sliding element provided on the housing, wherein the sliding element is provided with at least one stop projection which defines a range of displacement of the sliding element relative to the housing.

5. A filter with housing, comprising a filter element in the form of a cylindrical cartridge, a housing and a housing lid, wherein the housing has a raw air inlet and a clean air outlet, and the clean air outlet is provided with a connecting support on which the filter element is arranged, the filter element has a radial gasket on the side facing the connecting support, and the filter element on the side opposite from the connecting support is guided by a sliding element provided on the housing, wherein a blocking element, which prevents closure of the housing lid whenever the filter element is not properly installed, is provided on the sliding element.

6. A filter with housing according to claim 1, wherein the filter element is provided with a support body, and the support body cooperates with a connecting piece to seal a clean air chamber of the filter.

7. A filter with housing according to claim 6, wherein a sealing gasket is provided between the support body and the connecting piece.

8. A filter with housing according to claim 7, wherein said sealing gasket is an O-ring gasket.

\* \* \* \* \*